(12) United States Patent
Rao et al.

(10) Patent No.: US 11,785,941 B2
(45) Date of Patent: Oct. 17, 2023

(54) VITRIFICATION DEVICE FOR GAMETES OR EMBRYOS

(71) Applicant: Zhejiang University, Hangzhou (CN)

(72) Inventors: Jinpeng Rao, Hangzhou (CN); Min Jin, Hangzhou (CN); Shen Tian, Hangzhou (CN); Chun Feng, Hangzhou (CN); Fan Jin, Hangzhou (CN); Ya Yu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/980,887

(22) Filed: Nov. 4, 2022

(65) Prior Publication Data
US 2023/0172191 A1    Jun. 8, 2023

(30) Foreign Application Priority Data
Nov. 29, 2021  (CN) .......................... 202122946333.1

(51) Int. Cl.
*A01N 1/02*    (2006.01)

(52) U.S. Cl.
CPC .................................. *A01N 1/0268* (2013.01)

(58) Field of Classification Search
CPC .................................................... A01N 1/0268
See application file for complete search history.

(56) References Cited

U.S. PATENT DOCUMENTS

| 10,531,657 | B2* | 1/2020 | Farrington | B01L 3/50825 |
| 2004/0259072 | A1* | 12/2004 | Kuwayama | A01N 1/02 |
| | | | | 435/325 |
| 2008/0038155 | A1* | 2/2008 | Chian | A61D 19/024 |
| | | | | 435/307.1 |
| 2008/0220507 | A1* | 9/2008 | Clairaz | A01N 1/02 |
| | | | | 435/283.1 |
| 2008/0233633 | A1* | 9/2008 | Clairaz | B01L 3/505 |
| | | | | 435/284.1 |
| 2014/0308655 | A1* | 10/2014 | Mogas | A01N 1/0268 |
| | | | | 435/307.1 |
| 2015/0044765 | A1* | 2/2015 | Inoue | A01N 1/0268 |
| | | | | 435/307.1 |
| 2016/0057991 | A1* | 3/2016 | Matsuzawa | A01N 1/021 |
| | | | | 435/307.1 |
| 2016/0120172 | A1* | 5/2016 | Grevle | A01N 1/0268 |
| | | | | 435/307.1 |

(Continued)

*Primary Examiner* — William H. Beisner
*Assistant Examiner* — Danielle B Henkel
(74) *Attorney, Agent, or Firm* — WPAT, P.C

(57) ABSTRACT

A vitrification device for gametes or embryos, wherein, the vitrification straw comprises: a loading rod, wherein the loading rod is a metal rod; a loading strip, wherein, the loading strip is connected with one end of the loading rod. According to the present invention, the loading rod is arranged as metal rod, which avoids embrittlement fracture caused by sudden temperature change when the loading rod is taken out of liquid nitrogen, moreover, the ice crystals that form on gametes or embryos when the loading rod floats out of the surface of liquid nitrogen, affecting the safety of gametes or embryos, the metal material used by this invention can increase the weight of the loading rod, preventing it from floating up in the liquid nitrogen, hence improve safety of gametes or embryos.

10 Claims, 3 Drawing Sheets

(56) References Cited

U.S. PATENT DOCUMENTS

| | | | |
|---|---|---|---|
| 2016/0174545 A1* | 6/2016 | Parra | A01N 1/0257 |
| | | | 435/284.1 |
| 2020/0390090 A1* | 12/2020 | Parmegiani | A01N 1/0268 |
| 2022/0408721 A1* | 12/2022 | Li | A61B 10/0096 |

* cited by examiner

VITRIFICATION DEVICE FOR GAMETES OR EMBRYOS

TECHNICAL FIELD

This invention relates to the technical field of assisted reproductive technology, particularly relates to vitrification device for gametes or embryos in the process of in-vitro fertilization.

BACKGROUND

With advancing age, female's ovarian reserve shows a downward trend, making natural conception difficult. Nowadays, more and more women suffered from infertility can benefit from assisted reproductive technologies, including in-vitro fertilization and embryo transfer (IVF-ET). In some IVF-ET cases, the patient's gametes (oocytes and sperms) or embryos need to be cryopreserved in embryonic laboratory. At present, the technology of cryopreservation of gametes and embryos including programmed cryopreservation and vitrification. Compared with programmed cryopreservation, vitrification is recently applied in most embryonic laboratories because it doesn't need an expensive programmed freezer, and has the advantages of timesaving and better post-thaw cell survival rate.

At present, the loading rod of vitrification straw is utilized in domestic and foreign centers for reproductive medicine as the carrier to contain and maintain gametes or embryos. During vitrification, the straw will be plunged into liquid nitrogen at minus 196° C. When thawing gametes or embryos, the vitrification straw will be taken out of liquid nitrogen and plunged into the thawing solution at the temperature of 37° C.

However, the inventor of the present invention found that the above-mentioned prior art has at least the following technical problems described as follows: the vitrification straw could easily fracture after being taken out of liquid nitrogen, resulting in the loss of gametes or embryos.

SUMMARY

A purpose of the invention is to provide vitrification device for gametes or embryos cryopreservation, in order to solve the technical problem exists in the prior art that the loading rod of vitrification straw is easy to fracture after being taken out of liquid nitrogen, resulting in the loss of gametes or embryos.

Specifically, the purpose of the invention can be realized as follows:

Vitrification device for gametes or embryos, comprising vitrification straw, wherein, the vitrification straw, comprising:

a loading rod, wherein, the loading rod is a metal rod, and an insert is arranged at the end of the loading rod;
a loading strip, wherein, one end of the loading strip is connected with one end of the loading rod;
wherein, the loading strip, comprising:
a loading strip body;
an insert, wherein, one end of the insert is fixedly connected with one end of the body of loading strip, wherein, the cavity insert is formed on the end face of the other end of the connector;
wherein, the loading strip is a disposable plastic strip, and the loading strip is detachably connected with the loading rod, the loading strip is provided with the cavity insert matched with the insert, and the loading strip is detachably connected with the loading rod through the matching of the insert and the cavity insert.

Further, the insert is in a flat cuboid shape, and the cavity insert is a rectangular groove matched with the insert.

Further, the loading rod, comprising: the loading rod body is shaped of cylinder, wherein, the insert is fixedly connected with one end of the loading rod body; the handle is in a flat cuboid shape, one end of the handle is connected with the other end of the loading rod body, and the width of the handle does not exceed the diameter of the loading rod body.

Further, the other end of the loading strip is a tip for guiding the loading strip into the outer straw, and one side of the tip is provided with a mark.

Further, the vitrification device, also comprising: a loading plate, wherein, a groove combination for holding the cryoprotectant is arranged on the loading plate, and the grooves of the groove combination are used for inserting the vitrification straw, the loading plate is provided with at least two circular grooves and one rectangular groove, the groove depth of the rectangular groove is smaller than that of the circular groove, and the width of the rectangular groove is smaller than the diameter of the circular groove.

Wherein, the rectangular groove is a long shallow groove with a length of 25 mm, a width of 5 mm and a depth of 4 mm; the circular groove has a diameter of 15 mm and a depth of 6 mm.

One or more technical solutions provided in this embodiment of the invention have at least the following technical effects or advantages:

The metal loading rod applied by the present invention can avoid embrittlement caused by sudden temperature change when the loading rod is taken out of liquid nitrogen, thus increasing the safety and efficiency by preventing the loss of gametes or embryos.

The ice crystals that form on gametes or embryos when the loading rod floats out of the surface of liquid nitrogen, affecting the safety of gametes or embryos, the metal material used by this invention can increase the weight of the loading rod, preventing it from floating up in the liquid nitrogen, hence increase safety of gametes or embryos.

The loading strip is detachably connected with the loading rod; after use, the disposable strip is removed and discarded, while the metal loading rod can be disinfected and reused, thus reducing the consumption of disposable materials, and lowering cost per unit, which is more economical and environment-friendly.

The loading rod body is a cylinder with a length of 40 mm and a diameter of 2.5 mm, which is shorter than that of the prior art, thus making it less likely to break. The handle is a flat cuboid with a width of 2.5 mm, a length of 25 mm and a thickness of 1 mm, which can be held by hand, and marked to distinguish patients.

The loading strip body and the insert are made of high-density polyethylene with low brittle temperature, which prevents the vitrification straw from embrittlement and fracture, thus avoiding the loss of gametes or embryos.

The insert is in a flat cuboid shape, and the cavity insert is a matched rectangular groove, which can effectively ensure the reliability of connection by preventing the insert from rotating after being inserted into the cavity insert.

The head end of the loading strip body is a tip for guiding the loading strip into the outer straw, so that it is convenient to insert the strip into the outer straw in liquid nitrogen.

The tip is in triangular pyramid shape, and one side of the tip is provided with a mark for showing the side for loading gametes or embryos, so as to avoid the loss of the gametes or embryos.

Compared with the circular groove, the rectangular groove provided in the loading plate in the embodiment of the invention can effectively save the dosage of cryoprotectant, moreover, it is easy for operators to quickly find gametes (oocytes and sperm) or embryos under the microscope, eliminating the possibility of soaking oocytes and sperm in cryoprotectant for an excessive time spent in finding them under the microscope (the excessive time of soaking oocytes and sperm in cryoprotectant could cause toxic damage to them, affecting the replacement of intracellular and extracellular fluids, and even leading to survival failure and degradation of the gametes or embryos).

To sum up, the vitrification device provided by the present invention is reasonable in design, which can help operators to better avoid accidents such as loss and degradation of gametes or embryos during operation, and it has positive significance and practical value.

DETAILED DESCRIPTION OF EMBODIMENTS

A purpose of the invention is to provide a vitrification device for gametes or embryos, in order to solve the technical problem exist in the prior art that the loading rod of vitrification straw is easy to fracture after being taken out of liquid nitrogen, resulting in the loss of gametes or embryos.

In order to solve the problem mentioned above, this invention provides technical solutions as follows: the loading rod is arranged to be metal rod, which avoids embrittlement caused by sudden temperature change when the loading rod is taken out of liquid nitrogen. Moreover, the ice crystals that form on gametes or embryos when the loading rod floats out of the surface of liquid nitrogen would damage the gametes or embryos, the metal loading rod used by this invention can increase the weight of the loading rod, preventing it from floating up in the surface of liquid nitrogen, hence increase safety of gametes or embryos.

The technical solution of this invention will be described in details by the following Figures and specific embodiments. It should be understood that the embodiments of this application and the specific features in the embodiments are detailed descriptions of the technical solution of this application, rather than limitations on the technical solution of this invention. The embodiments of this invention and the technical features in the embodiments can be combined with each other without conflict.

Figure 1:
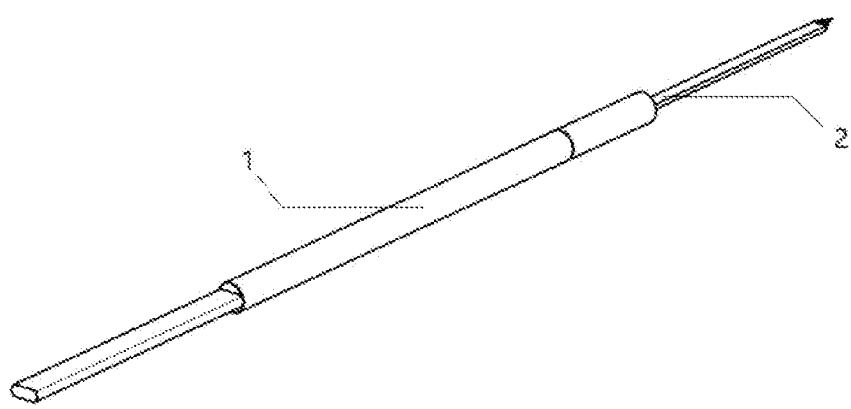
FIG. 1 illustrates a schematic view of a vitrification straw of a vitrification device for gametes or embryos provided by an embodiment of the present invention.

FIG. 1 illustrates a schematic view of a vitrification straw of a vitrification device for gametes or embryos provided by an embodiment of the present invention; as FIG. 1 illustrates, the vitrification straw comprises:

A loading rod 1 which is a metal rod, such as a stainless steel rod;

A loading strip 2 connected to one end of the loading rod 1.

The applicant of the present invention found that the most of the vitrification straw used by the prior art is made of plastic material, and when the plastic loading rod is taken out of liquid nitrogen at −196° C. and put in the room temperature environment (25° C.), the rod may be embrittled to break due to the sudden change of temperature. In addition, the rod of the prior art is thin and long, and if the operator does not move gently enough, too much downward pressure could be exerted on the rod during thawing, which may break it at the center, thus leading to the loss of gametes and embryos.

According to the present invention, the loading rod is arranged as metal rod, which avoids embrittlement caused by sudden temperature change when the loading rod is taken out of liquid nitrogen, moreover, the ice crystals that form on gametes or embryos when the loading rod floats out of the surface of liquid nitrogen, affecting the safety of gametes or embryos, the metal rod applied by this invention can increase the weight of the loading rod, preventing it from floating up in the liquid nitrogen, hence increase safety of gametes or embryos.

Further, the loading strip 2 is a disposable plastic strip, and the loading strip 2 is detachably connected with the loading rod 1.

Specifically, the loading strip 2 is detachably connected with the loading rod 1. After being used, the disposable loading strip 2 can be removed and discarded, while the metal loading rod 1 can be disinfected and reused, thus reducing the consumption of disposable materials, and lowering per unit cost, which is economical and environment-friendly.

Figure 2:
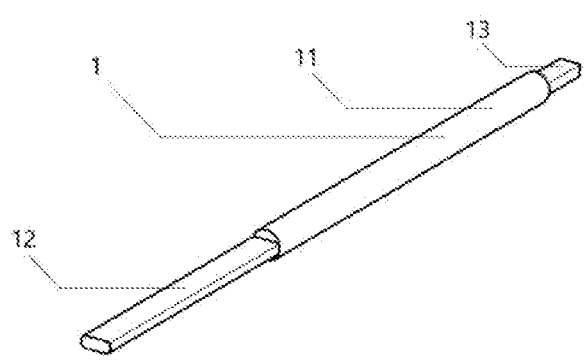
FIG. 2 illustrates a schematic view of a loading rod of a vitrification straw of the vitrification device for gametes or embryos provided by an embodiment of the present invention.
Figure 3:
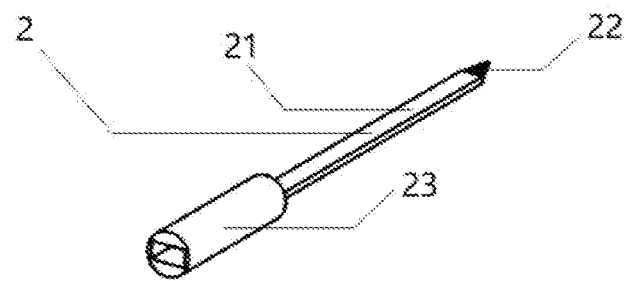
FIG. 3 illustrates a schematic view of a loading strip of a vitrification straw of the vitrification device for gametes or embryos provided by an embodiment of the present invention.

Further, FIG. 2 and FIG. 3 illustrate, wherein, the loading rod 1 is provided with an insert 13, the loading strip 2 is provided with a cavity insert matched with the insert 13, and the loading strip 2 and the loading rod 1 are detachably connected through the matching of the insert 13 and the cavity insert.

Specifically, inserting and unplugging the insert 13 by aligning the cavity insert, in order to connect and separate the loading strip 2 and the loading rod 1.

Further, as FIG. 2 illustrates, the loading rod 1 comprises:
the loading rod body 11 is cylindrical, and the insert 13 is fixedly connected with one end of the loading rod body 11;
the handle 12 is a flat cuboid, and one end of the handle 12 is connected with the other end of the loading rod body 11, and the width of the handle 12 does not exceed the diameter of the loading rod body 11.

Specifically, the loading rod body 11 is a cylinder with a length of 40 mm and a diameter of 2.5 mm, which is shorter than the rod commonly used in prior art, thus further reducing the risk of fracture during using. The handle 12 is a flat cuboid with a width of 2.5 mm, a length of 25 mm and a thickness of 1 mm, which can be held by hand, and can be marked upon to identify patients.

Further, as FIG. 3 illustrates, the loading strip 2 includes:
a loading strip body 21;
an insert 23, one end of the insert is fixedly connected with one end of the loading strip body 21, and the cavity insert is formed on the end face of the other end of the insert 23, and the insert is in cylindrical shape.

Specifically, the loading strip body 21 is a transparent strip with a length of 20 mm, a width of 1 mm and a thickness of 0.2 mm. The insert 23 is a cylinder with a length of 10 mm and a diameter of 2.5 mm.

Further, the loading strip body 21 and the insert 23 are made of high-density polyethylene with low brittle temperature, which prevents the vitrification straw from embrittlement and fracture, thus avoiding the loss of gametes or embryos.

Further, the insert 13 is in the shape of a flat cuboid, and the cavity insert is a matched rectangular groove.

Specifically, the insert 13 is in the shape of a flat cuboid, and the cavity insert is a matched rectangular groove, which can effectively prevent the insert 13 from rotating after being inserted into the cavity insert, thus ensuring the reliability of connection.

Further, the other end of the loading strip body 21 is a tip 22 for guiding the loading strip 2 into the outer straw, making loading strip easily insert into the outer straw in liquid nitrogen.

Further, the tip is in triangular pyramid shape, and one side of the tip is provided with a mark.

Specifically, in this embodiment, the mark is a color mark, which is used to show the side for loading the gametes or embryos, so as to avoid the loss of the gametes or embryos.

Figure 4:
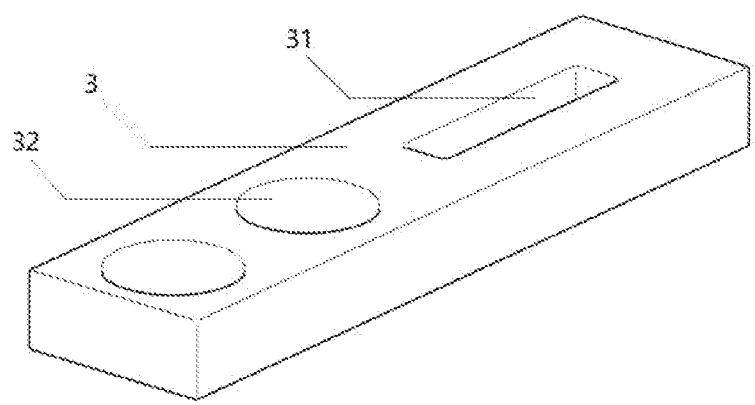
FIG. 4 illustrates a schematic view of a loading plate of a vitrification device for gametes or embryos provided by an embodiment of the present invention.
Figure 5:
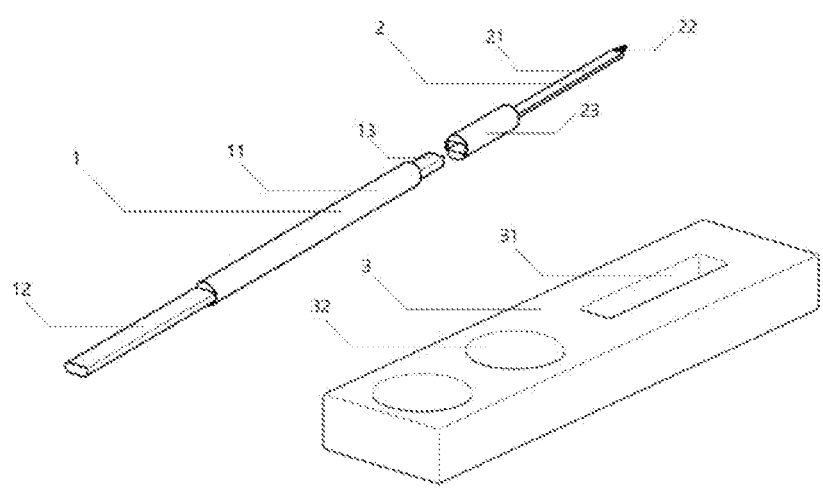
FIG. 5 illustrates a schematic structural explosion view of a vitrification device for gametes or embryos provided by an embodiment of the present invention.
Figure 6:
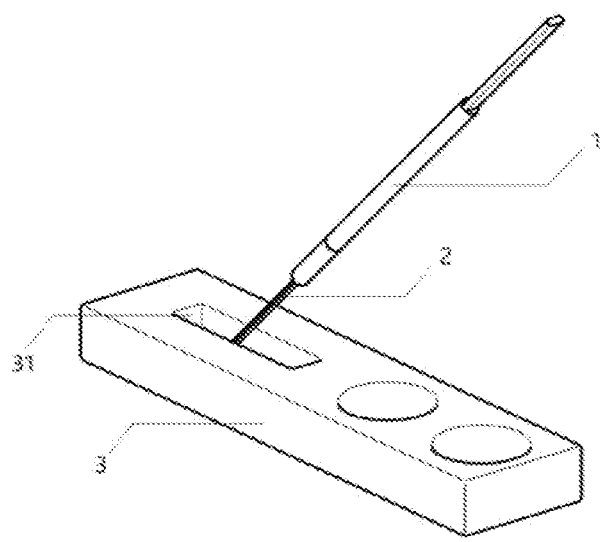
FIG. 6 illustrates a schematic view of the cooperation of a vitrification straw and a plate of a vitrification device for gametes or embryos provided by an embodiment of the present invention.

Further, the vitrification device also comprises a loading plate 3, as FIG. 4-FIG. 6 illustrate, the loading plate 3 is provided with a groove combination for holding cryoprotectant, the loading strip 2 of vitrification straw can respectively insert into the grooves in the groove combination, the groove combination comprises at least two circular grooves and a rectangular groove 31, wherein the groove depth of the rectangular groove 31 is smaller than that of the circular groove, and the width of the rectangular groove 31 is smaller than the diameter of the circular groove.

Specifically, the loading plate 3 is in the shape of a transparent cuboid, with a length of 80 mm, a width of 20 mm and a height of 8 mm, and all the grooves are formed on the upper surface of the loading plate 3. The circular groove and the rectangular groove are respectively used for holding cryoprotectant, and the loading strip is inserted into the grooves for thawing.

Further, the rectangular groove 31 is a long shallow groove with a length of 25 mm, a width of 5 mm and a depth of 4 mm, and the circular groove has a diameter of 15 mm and a depth of 6 mm.

At present, the commercial loading plates 3 used for thawing are mostly equipped with circular holes, but the volume of circular hole is relatively big, which might take the operator longer time to find the embryos or gametes (especially tiny sperm) under the microscope. Leaving embryos or gametes in thawing solution that contains high concentration for excessive time (over 1 minute) could cause toxic damage to them, affecting the replacement of intracellular and extracellular fluids, and even leading to recovery failure and degradation. Therefore, according to this invention, it is of positive significance and practical value to optimize the existing vitrification device for gametes and embryos, in order to avoid accidents such as loss and degradation during operation.

Compared with the circular groove, the rectangular groove 31 provided in the loading plate 3 of this embodiment can effectively save the volume of cryoprotectant (taking the manual of commonly used KITAZATO device of Japan for example, during thawing operation, the thawing solution in the first hole is often with a large volume, which could result in waste for the No. 2, No. 3 and No. 4 solutions while the No. 1 solution has been used up), moreover, it is easy for operators to quickly find gametes (oocytes and sperm) or embryos under the microscope, eliminating the possibility of leaving oocytes and sperm in cryoprotectant for an excessive time spent in finding them under the microscope (the excessive time of soaking oocytes and sperm in cryoprotectant could cause toxin damage to them, affecting the replacement of intracellular and extracellular fluids, and even leading to recovery failure and degradation).

To sum up, the vitrification device provided by the present invention is reasonable in design, which could help operators to better avoid accidents such as loss and degradation of gametes or embryos during operation, and it has positive significance and practical value.

One or more technical solutions provided in this embodiment of the invention have at least the following technical effects or advantages:

The metal loading rod 1 applied by the present invention can avoid embrittlement caused by sudden temperature change when the loading rod is taken out of liquid nitrogen, thus increasing the safety and efficiency by preventing the loss of gametes or embryos.

The ice crystals that form on gametes or embryos when the loading rod 1 floats out of the surface of liquid nitrogen, affecting the safety of gametes or embryos, the metal material used by this invention can increase the weight of the loading rod 1, preventing it from floating up in the liquid nitrogen, hence improves safety of gametes or embryos.

The loading strip 2 is detachably connected with the loading rod 1; after being used, the disposable strip is removed and discarded, while the metal loading rod 1 can be disinfected and reused, thus reducing the consumption of disposable materials, and lowering per unit cost, which is more economical and environment-friendly.

The loading rod body 11 is a cylinder with a length of 40 mm and a diameter of 2.5 mm, which is shorter than that of the prior art, thus making it less likely to break. The handle 12 is a flat cuboid with a width of 2.5 mm, a length of 25 mm and a thickness of 1 mm, which can be held by hand, and marked to distinguish patients.

The loading strip body 21 and the insert 23 are made of high-density polyethylene with low brittle temperature, which prevents the vitrification straw from embrittlement, thus avoiding the loss of gametes or embryos.

The insert 13 is in a flat cuboid shape, and the cavity insert is a matched rectangular groove, which can effectively ensure the reliability of connection by prevent the insert 13 from rotating after being inserted into the cavity insert.

The head end of the loading strip body 21 is a tip for guiding the loading strip 2 into the outer straw, so that it is convenient to insert the strip into the outer straw in liquid nitrogen.

The tip 22 is in triangular pyramid shape, and one side of the tip 22 is provided with a mark for showing the side for loading gametes or embryos, so as to avoid the loss of the gametes or embryos.

Compared with the circular groove 31, the rectangular groove provided in the loading plate 3 in the embodiment of the invention can effectively save the dosage of cryoprotectant, moreover, it is easy for operators to quickly find gametes (oocytes and sperm) or embryos under the microscope, eliminating the possibility of leaving oocytes and sperm in cryoprotectant for an excessive time spent in finding them under the microscope (the excessive time of soaking oocytes and sperm in cryoprotectant could cause toxic damage to them, affecting the replacement of intracellular and extracellular fluids, and even leading to recovery failure and degradation).

To sum up, the vitrification device provided by the present invention is reasonable in design, can help operators to better avoid accidents such as loss and degradation of gametes or embryos during operation, and it has positive significance and practical value.

It should be understood that although the quantitative terms "first", "second" and so on may be used here to describe each unit, these units should not be limited by these terms. These terms are used only to distinguish one unit from another. For example, without departing from the scope of the exemplary embodiment, the first unit may be called the second unit, and similarly, the second unit may be called the first unit.

The terms of outer, middle and inner directions mentioned or possibly mentioned in this specification are defined relative to the structures shown in the figures. They are relative concepts, so they may change correspondingly according to their different positions and different use states. Therefore, these or other positional terms should not be interpreted as restrictive terms.

The above is only the preferred embodiment of this application, not any formal or substantial limitation to this application. It should be pointed out that the ordinary technicians in this technical field can make some improvements and supplements without departing from the method of this application, and these improvements and supplements should also be regarded as the protection scope of this utility model. Those skilled in this field, without departing from the spirit and scope of this application, can make some changes, modifications and equivalent changes by using the technical content disclosed above, all of which are equivalent embodiments of this application; Meanwhile, any changes, modifications and evolutions equivalent to the above-mentioned embodiments made according to the essential technology of this application are still within the scope of the technical scheme of this application.

What is claimed is:

1. A vitrification device for gametes or embryos, comprising a vitrification straw, wherein, the vitrification straw, comprises:
    a loading rod, wherein, the loading rod is a metal rod, and the loading rod comprises:
       a loading rod body, wherein the loading rod body is a cylinder and comprises a first circular surface and a second circular surface opposite to each other;
       a first insert, directly connected with the first circular surface of the loading rod body; wherein the first insert has a flat cuboid shape;
       a handle, directly connected with the second circular surface of the loading rod body; wherein the handle has another flat cuboid shape and comprises two opposite planes directly connected to the second circular surface of the loading rod body;
    a loading strip, wherein the loading strip is a disposable plastic strip, the loading strip is detachably connected with the loading rod, and the loading strip comprises:
       a loading strip body;
       a second insert, directly connected with the loading strip body; wherein, the second insert defines a cavity insert with an opening at an end of the second insert facing away from the loading strip body, and the loading strip is detachably connected with the loading rod through matching of the first insert and the cavity insert.

2. The vitrification device for gametes or embryos as claimed in claim 1, wherein the cavity insert is a rectangular groove matched with the first insert.

3. The vitrification device for gametes or embryos as claimed in claim 1, wherein a width of the handle does not exceed a diameter of the loading rod body.

4. The vitrification device for gametes or embryos as claimed in claim 1, wherein the loading strip further comprises a tip for guiding the loading strip into an outer straw, and one side of the tip is provided with a mark.

5. The vitrification device for gametes or embryos as claimed in claim 1, wherein, the vitrification device, also comprising: a loading plate, wherein, a groove combination for holding the cryoprotectant is arranged on the loading plate, and the grooves of the groove combination are used for inserting the vitrification straw,
    the loading plate is provided with at least two circular grooves and one rectangular groove, the groove depth of the rectangular groove is smaller than that of the circular groove, and the width of the rectangular groove is smaller than the diameter of the circular groove.

6. The vitrification device for gametes or embryos as claimed in claim 5, wherein, the rectangular groove is a long shallow groove with a length of 25 mm, a width of 5 mm and a depth of 4 mm; the circular groove has a diameter of 15 mm and a depth of 6 mm.

7. The vitrification device for gametes or embryos as claimed in claim 4, wherein the tip is directly connected with an end of the loading strip body facing away from the second insert, and the tip is in a triangular pyramid shape.

8. The vitrification device for gametes or embryos as claimed in claim 1, wherein a length of loading strip body is greater than a length of the handle.

9. A vitrification device for gametes or embryos, comprising: a handle, a loading rod, and a loading strip;
    wherein the handle is in a flat cuboid shape and arranged at an end of loading rod, the loading rod is a metal rod, and the loading strip is arranged at the other end of the loading rod; the handle comprises two opposite planes directly connected to a circular surface of a loading rod body of the loading rod;
    wherein the loading rod comprises a first insert and the loading rod body, the loading rod body is cylindrical and the first insert is in a flat cuboid shape; a width of the handle is smaller than a diameter of the loading rod body, and another circular surface of the loading rod body is connected to the first insert; and
    wherein the loading strip comprises a second insert, a loading strip body, and a tip; the loading strip body is arranged between the second insert and the tip; the second insert is cylindrical without protrusions and recesses on a cylindrical surface of the second insert and an end face of the second insert is provided with a cavity insert, the loading strip body is in a flat cuboid shape, a width of the loading strip body is smaller than a diameter of the second insert, the cavity insert is a rectangular groove matched with the first insert, the loading strip is detachably connected with the loading rod through the matching of the first insert and the cavity insert, the tip is configured for guiding the loading strip into an outer straw, a side of the tip is provided with a mark, and the tip is in a triangular pyramid shape.

10. The vitrification device for gametes or embryos as claimed in claim 9, wherein a length of loading strip body is greater than a length of the handle.

* * * * *